United States Patent

Schwarz

[11] Patent Number: 5,943,434
[45] Date of Patent: Aug. 24, 1999

[54] METHOD FOR IMAGE RECONSTRUCTION FROM PROJECTON DATA WITH FAST CONVOLUTION OF PROJECTIONS

[75] Inventor: Karl Schwarz, Roth, Germany

[73] Assignee: Siemens Aktiengesellschaft, Munich, Germany

[21] Appl. No.: 08/885,754

[22] Filed: Jun. 30, 1997

[30] Foreign Application Priority Data

Jul. 3, 1996 [DE] Germany .................. 196 26 775

[51] Int. Cl.⁶ ................ G06K 9/00; A61B 6/00
[52] U.S. Cl. .............. 382/131; 328/128; 328/132; 328/279; 328/280; 378/4; 378/21; 378/22; 378/23; 378/24; 378/25; 378/26; 378/27; 378/28; 378/46
[58] Field of Search ................ 382/278, 279, 382/280, 284, 210, 128, 129, 130, 131, 132, 133, 134; 378/4, 21, 22–28, 46, 64, 74, 90

[56] References Cited

U.S. PATENT DOCUMENTS

| | | | |
|---|---|---|---|
| 4,187,000 | 2/1980 | Constant | 350/162 SF |
| 4,606,004 | 8/1986 | Crawford et al. | 364/414 |
| 4,797,923 | 1/1989 | Clarke | 381/31 |
| 4,833,698 | 5/1989 | Flannery ey al. | 378/19 |
| 4,891,829 | 1/1990 | Deckman et al. | 378/4 |
| 5,168,375 | 12/1992 | Reisch et al. | 358/432 |
| 5,406,479 | 4/1995 | Harman | 364/413.17 |
| 5,446,799 | 8/1995 | Tuy | 382/132 |
| 5,706,216 | 1/1998 | Reisch | 364/715.02 |
| 5,724,400 | 3/1998 | Swerdloff et al. | 378/65 |

OTHER PUBLICATIONS

"Digital Image Processing," Gonzalez et al., Jun., 1992, pp. 100–128.
Reconstruction of Magnetic Resonance Images Using One–Dimensional Techniques, Vassiliadis et al., IEEE Trans. on Med. Imaging, Vol. 12, No. 4, Dec., 1993, pp. 758–763.

Primary Examiner—Leo H. Boudreau
Assistant Examiner—Kanji Patel
Attorney, Agent, or Firm—Hill & Simpson

[57] ABSTRACT

In a method for image reconstruction in imaging technology for the implementation of a fast convolution with the transformation length M while allowing slight over-convolution errors, each of p or 2p out of n measured projections of the length N are convolved with a modified filter kernel $\hat{h}(k)$ using Fast Fourier Transform (FFT) and Inverse Fast Fourier Transform (IFFT) simultaneously in one step.

2 Claims, 16 Drawing Sheets

METHOD FOR IMAGE RECONSTRUCTION FROM PROJECTON DATA WITH FAST CONVOLUTION OF PROJECTIONS

BACKGROUND OF THE INVENTION

1. Field of the Invention

The present invention is directed to a method for image reconstruction in imaging technology for the implementation of a fast convolution with a transformation length M while allowing slight over-convolution errors, whereby measured projections of a length N are convoluted with a modified filter kernel by means of Fast Fourier Transform (FFT) and Inverse Fast Fourier Transform (IFFT).

2. Description of the Prior Art

In imaging technology, for example computed tomography, data comprising projections of a patient obtained, for example, by a radiological measuring system rotating around the patient, are subjected to several mathematical operations for image reconstruction, including, among other things, convolution with a filter kernel. Extensive smearing of individual subject details in the reconstructed image, which would otherwise occur given an immediate back-projection of measured attenuation profiles (projections), are avoided by the convolution, which essentially corresponds to a high-pass filtering. The convolution is thus an important prerequisite for the determination of an immediate image, i.e., making the calculated image available immediately after the end of the measuring event. Since the reconstruction of images, consequently, must be undertaken rapidly, a technique known as "fast convolution", which is usually calculated cyclically for discrete functions, is utilized for the calculation of the convolution, i.e. for fast implementation of the convolution in a computer.

Gonzalez, R. C.; Woods, R. E., "Digital Image Processing", Addison-Wesley, June 1992, describes the convolution of two functions with Fast Fourier and Inverse Fast Fourier Transformation.

Vassiliadis, K. P., et al., "Reconstruction of Magnetic Resonance Images Using One-Dimensional Techniques", IEEE Transactions on Medical Imaging, Vol. 12, No. 4, December 1993, pp. 758–763, discloses the equivalency between a multi-dimensional and a one-dimensional discrete function.

When a vector formed from a projection is N elements long and is to be convoluted with a filter kernel, then the transformation length M must be $M \geq 2N-1$ according to the theory of fast convolution in order to obtain error-free results from the fast convolution. Since only powers of 2 with the transformation length $M=2^m$ are usually available in the implementation of the fast convolution using Fast Fourier Transformation and Inverse Fast Fourier Transformation from vector libraries, the smallest power of 2 that meets the condition $M=2^m \geq 2N-1$ is consequently selected as the transformation length.

The selection of M is simple when N is a power of 2 such as $2^{m-1}$. When, however, the length N of the vector to be convoluted is not a power of 2 (for example, N=1536), then the transformation length M must be rounded up to the next power of 2 (for example, 4096 here). An unnecessary excess of M−(2N−1) values (for example, 1025 here) thereby arises that must be processed in the fast convolution, and can lead to an undesirably long calculating time of the fast convolution.

In order to reduce this increase in calculating time, a known method for fast "convolution with the next power of 2" shown in FIG. 1 can be employed when over-convolution errors are permitted. A vector formed from a projection with the length N ($2^{m-1} \leq N < 2^m$, for example $N \approx 0.6 \ast 2^m$) is thereby expanded to the transformation length $M=N+S=2^m$ by attaching S zeros to the projection with the length N. The filter core h(k) in the spatial domain (=impulse response) employed for the fast convolution is calculated for a transformation length of M, whereby the impulse response can also be selected a few values shorter than M for image improvement. After the fast convolution with the transformation length M of the vector with the filter kernel h(k) selected somewhat too short, the S+1 middle values in the filtered vector having the length N are correct, whereas a total of N−S−1 values are falsified at the right and left edges of the projection. On the one hand, an over-convolution error thereby arises due to the overly short transformation length M of the filter kernel h(k), and a part of the projection having the length N is weighted with incorrect filter coefficients. Since, however, these incorrect filter coefficients lie at the outer edge of the filter core and are thus very small, and, since the test subject also exhibits lower attenuation values at the edge, the error is negligible given an adequately large number of S zeros attached to a projection having the length N.

When the method for fast "convolution with the next power of 2" is implemented on a computer, then there are two possibilities for the implementation of the convolution. First, transformation of a projection with the transformation length M/2 with post-processing that corrects the incomplete transformation, and, second, transformation of two projections, one in the real and one in the imaginary part of a transformation having the transformation length M.

When, however, the number S (for example $S<0.5 \ast N$) of zeros attached to the projection having the length N is too low, the above-described method leads to an excessively large error at the outside edge of the reconstructed image that can no longer be tolerated.

SUMMARY OF THE INVENTION

An object of the present invention is to provide a method of the type initially described wherein the error occurring in the reconstructed image is reduced and the calculating time for the fast convolution is shortened.

This object is inventively achieved in a method for image reconstruction in imaging technology for the implementation of a fast convolution with the transformation length M while allowing slight over-convolution errors, whereby each projection of a portion p (or 2p) of n measured projections of the length N is convolved with a modified filter core $\hat{h}(k)$ using Fast Fourier Transform (FFT) and Inverse Fast Fourier Transform (IFFT) simultaneously in one step comprising the following sub-steps:

a) combining the p projections having the length N to a vector and attaching S zeros behind each of the p projections $$v(k) = \sum_{i=1}^{p} v_i(k - (i-1)(N+S)) \qquad (1)$$

with the transformation length M, b) selection of the parameters p and S such that the transformation length $$M = p(N+S) = 2^m \qquad (2)$$

for the implementation of the fast convolution is a power of 2, c) designing the filter kernel $\hat{h}(k)$ in the spatial domain such that it is substantially equal to a length N+S, and filling the filter kernel $\hat{h}(k)$ with zeros to the transformation length M according to $$\hat{h}(k) = \begin{cases} h(k) & \text{for } |k| < (N+S)/2 \\ 0 & \text{otherwise} \end{cases} \quad (3)$$

d) cyclical implementation of the fast convolution with the transformation length M according to $$y(k) = v(k) \; \textcircled{M} \; \hat{h}(k) = IFFT\{FFT\{v(k)\}FFT\{\hat{h}(k)\}\} \quad (4)$$

with $k = 0(1)(M-1)$, whereby the convolution result of a projection i exhibits the form $$y_i(k) = y(k+(i-1)(N+S)) \quad (5)$$

with $k=0(1)(N-1)$ and $i=1(1)p$

As a result of the simultaneous transformation of a number (p) of projections of the length N combined in a vector v(k) in a fast convolution step with a larger transformation length, the overhead of values that occurs in the defined fast convolution when the length N of the projections is not a power of 2 thus can be reduced. Moreover, by allowing slight errors in the implementation of the fast convolution according to the inventive method, the efficiency is enhanced further compared to the defined (conventional) fast convolution, without the oppositely directed and nearly compensating errors that occur noticeably disturbing the result of the image reconstruction. When, in the inventive method, the number S of zeros attached to a projection having the length N satisfies the condition $S \geq N-1$ and when the filter length of the filter kernel $\hat{h}(k)$ in the spatial domain lies between 2N −1 and 2S+1, one even obtains no over-convolution error, while still having the advantage that a calculation time reduction is achieved compared to the conventional, defined fast convolution given specific lengths of M and N (for example, N=682, M×4096, p=3). When the relationship S<N−1 is valid, over-convolution errors in fact occur in the fast convolution of the inventive method, but these can be neglected given employment in, for example, computed tomography and given a sufficiently large number of S zeros attached to a projection having the length N. The filter length in the spatial domain is thereby selected on the order of magnitude of N+S and filled with zeros to the transformation length M. When the filter length in the spatial domain is selected slightly shorter or longer than N+S, then—dependent on the calculation case—slightly better or poorer results in the image reconstruction are obtained, but with the advantage of being clearly faster than the defined convolution.

After the convolution of a vector v(k) with the modified convolution core $\hat{h}(k)$ according to the inventive method, the S+1 middle values of every filtered projection are correct. A total of N−S−1 values are then falsified at the right and left edges of every projection. Two error amounts are contained in these falsified values, these being illustrated in FIG. 2 that shows the faulty convolution of p=4 projections. First, an over-convolution error occurs because of the overly short length S of the zero sequence, so that a part of a following projection is weighted with filter coefficients and added (see FIG. 2, shaded region, given projection $v_4(k)$). Second, a further error occurs because, due to the filter length of the filter kernel $\hat{h}(k)$ selected overly short, a part of the projections is not filtered in the location domain of N+S (see FIG. 2, shaded region, given projection $v_1(k)$). These two errors, however, are oppositely directed since projections following shortly upon one another exhibit a similar curve given identical channels. The effective filter coefficients under such circumstances also do not differ very much, and the slope is inverse. An improvement of the error behavior can thus be achieved. Since, further, the effective filter coefficients are very small, an effect on the reconstructed image with an influence of more than one Hounsfield unit (HU) can be avoided given an adequately low selection of N−S. When the measurement field has a radius R, then the radius r at which there is no difference from the exact convolution in the image derives from the following (also see FIG. 5):

$$r = ((S+1)/N)*R. \quad (6)$$

When then inventive method for fast convolution is implemented in a computer, as in the case of fast "convolution with the next power of 2", the two aforementioned possibilities exist for implementing the convolution. First, transformation of p projections with the transformation length M/2 with a processing and, second, the transformation of 2*p projections per p in the real and p in the imaginary part of a transformation having the transformation length M. When the number of projections n is not divisible by p, the last valid projection is repeated in the last convolution in order to fill the vector. Making a transition to the defined fast convolution at this point would mean that the original filter kernel would also have to be utilized again. A filling of the vector in the last convolution with zeros would thereby only eliminate the error of over-convolution; the filter length of the filter kernel intentionally selected too short, however, would remain. The compensation effect could thus not be utilized given the occurrence of both errors.

DESCRIPTION OF THE PREFERRED EMBODIMENTS

Figure 1:
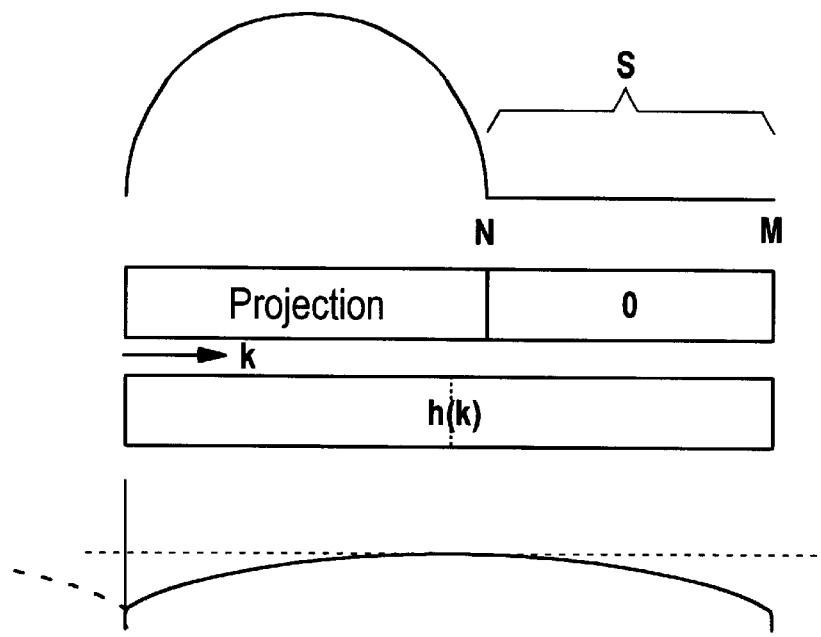
FIG. 1 shows an example of an error-affected convolution of a projection according to the method of fast "convolution with the next power of 2".
Figure 2:
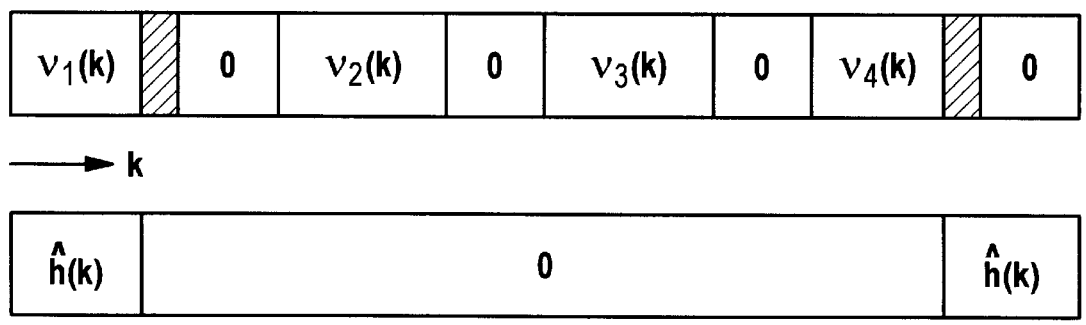
FIG. 2 shows an example of an error-affected convolution of p=4 projections according to the inventive method of fast convolution.
Figure 3:
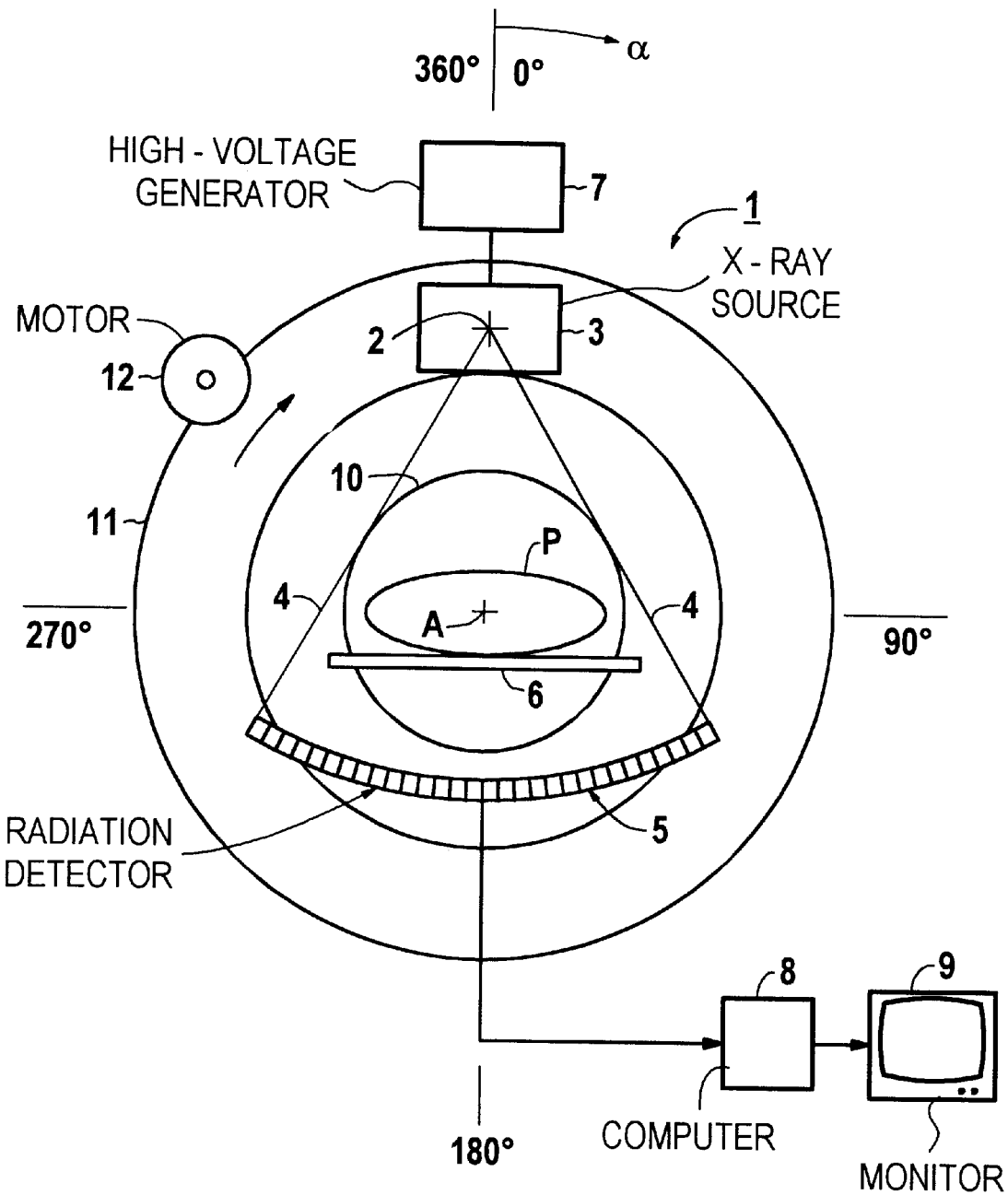
FIG. 3 shows a computed tomography apparatus for the implementation of the inventive method of simultaneous fast convolution of measured projections with a modified convolution kernel.

FIG. 3 shows a computed tomography apparatus 1 for the implementation of the inventive method of simultaneous fast convolution of measured projections with a modified convolution kernel. The computed tomography apparatus has a measuring system composed of an X-ray source 3 that emits a fan-shaped X-ray beam 4 and of a radiation receiver 5 that is composed of a number of individual detectors. The focus of the X-ray source 3 from which the X-ray beam 4 emanates is referenced 2. The patient P to be examined lies on a patient support 6.

For implementation of a radiological examination of a patient P, the measuring system is rotated through 360° around a measuring field in which the patient P lies. A motor 12 drives the gantry 11 for this purpose. A rotational axis A resides at a right angle relative to the fan-shaped X-ray beam 4. The X-ray source 3, which is fed by a high voltage generator 7, is operated pulsed or operated to emit continuous radiation. Projections of slices of the patient P are recorded at predetermined angular positions of the measuring system. The datasets, respectively composed of the measured data for each projection are supplied from the radiation receiver 5 to a computer 8 that calculates the attenuation coefficients or predetermined picture elements from the generated datasets and visually reproduces them on a monitor 9. Accordingly, an image of the transirradiated slice of the patient P appears on the monitor 9.

Figure 4:
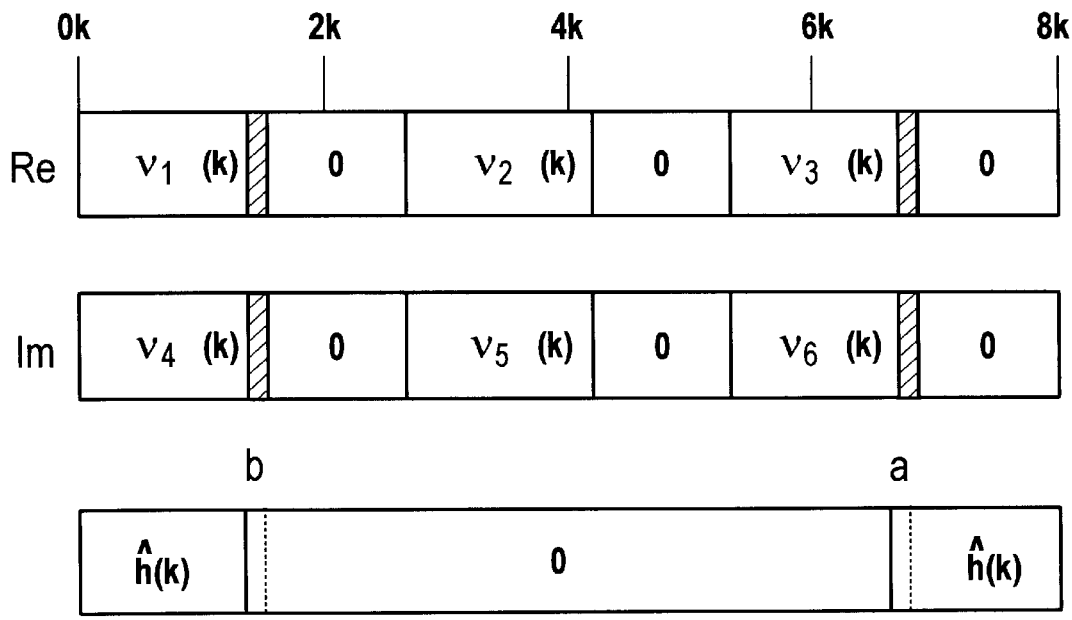
FIG. 4 shows an example of a simultaneous fast convolution of 2p=6 projections with over-convolution errors according to the inventive method.

Among other things, the calculation of the simultaneous fast convolution of the registered projections with a modified filter kernel is implemented in the computer 8. FIG. 4 shows an example of such a fast convolution according to the inventive method with 2p=6 projections having the length N=1536 channels, wherein the first p projections $v_1(k)$ through $v_3(k)$ are contained in the real part of the complex vector v(k) having the length M=8192 and the second p projections $v_4(k)$ through $v_6(k)$ are contained in the imaginary part of this vector v(k). As a result of the inventive method, thus, six projections can be simultaneously processed in a Fast Fourier Transformation having the transformation length $M=8192=2^{13}$. In contrast only two projections could be processed in the conventional, defined procedure with a Fast Fourier Transformation having the transformation length M=4096. Each projection $v_1(k)$ through $v_6(k)$ is followed by S=M/p−N=1194.7 zeros (1195 twice and 1194 once). Differing from the defined fast convolution, the length of the filter kernel $\hat{h}(k)$ in the spatial domain does not amount to 2N −1=3071 but to only N+S= 1536+1195=2731 values. The remaining values of the filter kernel are filled with zeros, so that the following equations are valid overall in the present case:

$$v(k) = \sum_{i=1}^{3} (v_i(k - (i-1)*(N+S)) + j*v_{i+3}(k - (i-1)*(N+S)))$$

$$\hat{h}(k) = \begin{cases} h(k) & \text{for } |k| < (N+S)/2 \\ 0 & \text{otherwise} \end{cases}$$

After the convolution, thus, only (N−S−1)/2, i.e. approximately 170 falsified values in the present case arise at the start and end of every filtered projection. These values, however, generally lie very close to the correct result of the exact convolution, since the overly added part in the over-convolution of another, close projection (see FIG. 4, a) is in turn compensated (also see FIG. 6) by the lack of an approximately numerically identical part (see FIG. 4, b) from the projection to be processed. The reason for this lies in the similarity of successive projections.

Figure 5:
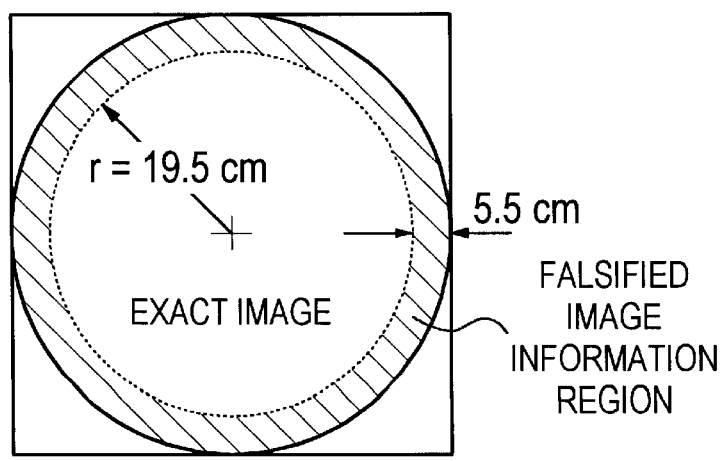
FIG. 5 shows regions with slightly falsified image information in the fast convolution according to the inventive method for N=1536, M=8192, p=3 and R=25 cm.

In this context, FIG. 5 illustrates the regions in a measuring field 10 (see FIG. 3) that exhibit slightly falsified image information in a reconstruction of an image according to the inventive method of fast convolution. When the measuring field 10 has a diameter of 2R=50 cm—which corresponds to N=1536 channels in the present case—, then 170 channels correspond to approximately 5.5 cm, i.e. only a slight falsification of the image information occurs in the annular region with a thickness of 5.5 cm shown shaded in FIG. 5. In the inner region of the measuring field 10 having a diameter of 39 cm (r=19.5 cm), by contrast, no difference occurs in the reconstructed image, when the image reconstruction is carried out with the inventive method of fast convolution instead of the defined method of fast convolution. As a result a zoom within this region also supplies an error-free image.

The error compensation in the inventive method of fast convolution of p=3 parallel projections having the length N=1536 channels is considered below in a comparison of the two calculating methods of convolution of measured projections of a water disc having a diameter of 49 cm with a filter kernel according to the defined method and the inventive method of fast convolution. In both calculation instances, convolution is carried out with the known Shepp-Logan Kernel.

In order to make the effects which occur more identifiable, a few vectors shall be defined first. First, a vector having the transformation length M that contains only one projection $v_i(k)$.

$$\tilde{v}_i(k) = \begin{cases} v_i(k - (i-1)(N+S)) & \text{for } k - (i-1)(N+S) = 0(1)N - 1 \\ 0 & \text{otherwise} \end{cases}$$

Then, the cyclical convolution of this vector with the impulse response of the filter kernel modified according to equation 3.

$$\tilde{y}_i(k) = \tilde{v}_i(k) \; \textcircled{M} \; \hat{h}(k) \text{ for } k = 0(1)M - 1 \qquad (8)$$

When all p signals are added up, then, for linearity reasons, the same convolution result is obtained as in the fast convolution with v(k) according to equation 4.

$$y(k) = \sum_{i=1}^{p} \tilde{y}_i(k) \text{ for } k = 0(1)M - 1 \qquad (9)$$

The convoluted, individual projection $y_i(k)$ is then:

$$y_i(k) = y(k+(i-1)(N+S)) \text{ for } k=0(1)N-1 \qquad (10)$$

The projection convoluted without error derives according to the following equation:

$$y_{ci}(k) = \sum_{K=0}^{N-1} v_i(K) \cdot h(k - K) \text{ for } k = 0(1)N - 1 \qquad (11)$$

The error in projection 1 is examined in greater detail as being representative for all convolved projections. The overall error arises from the difference of the inventive fast convolution of projection 1 from the defined fast convolution of the projection 1 according to equation 11.

$$e(k) = y_1(k) - y_{c1}(k) = y(k) - y_{c1}(k) \text{ for } k=0(1)N-1 \qquad (12)$$

Figure 6:
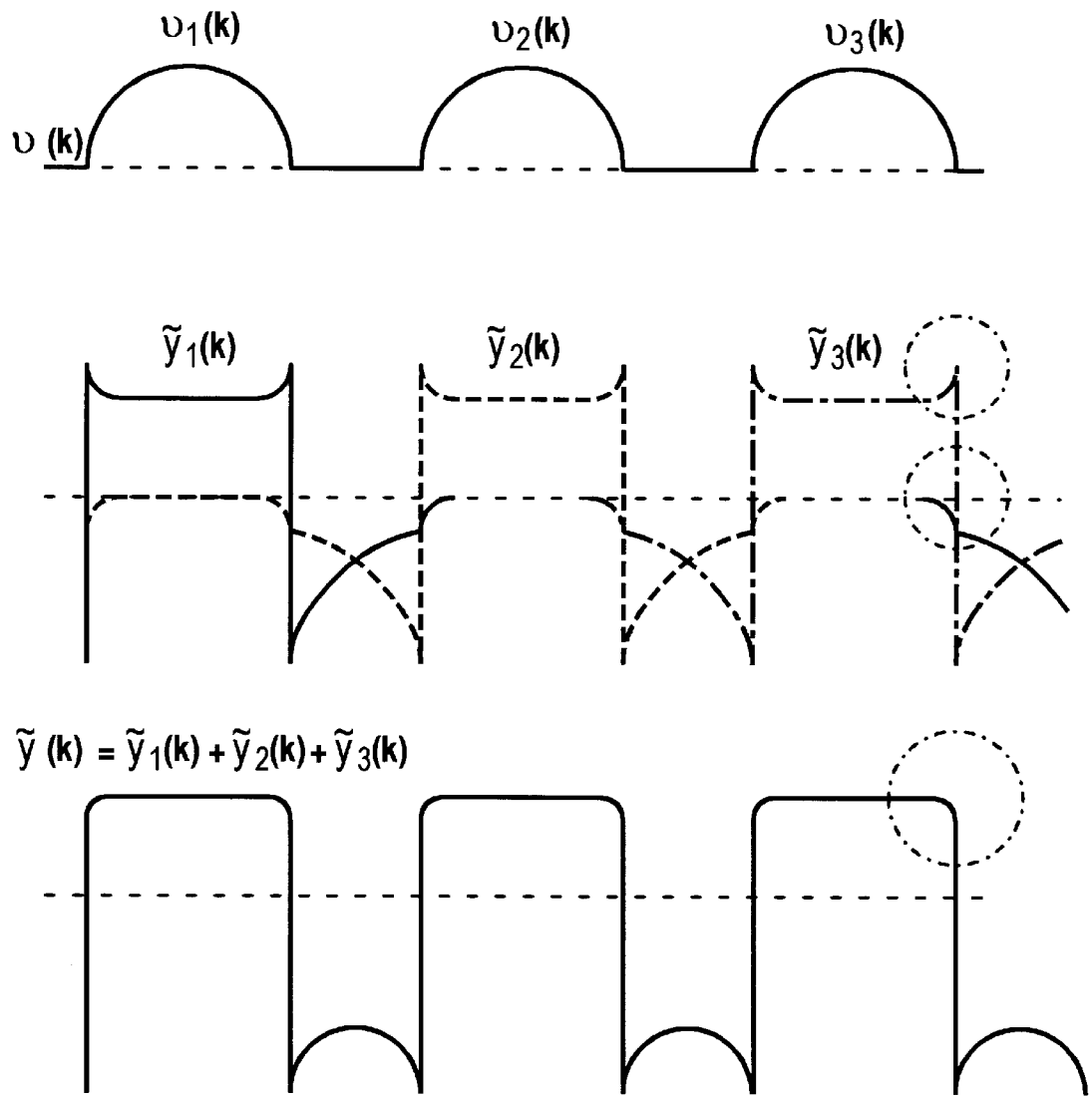
FIG. 6 is a schematic illustration of the error compensation given the simultaneous fast convolution of p=3 projections.

This error is composed of three parts. The first part is composed of the error $$\tilde{e}(k) = \tilde{y}_1(k) - y_{c1}(k) \text{ for } k=0(1)N-1 \qquad (13)$$

that stems from the overly short length of the filter core in the spatial domain, whereas errors 2 and 3 arise from the extinctions of $\tilde{y}_2(k)$ and $\tilde{y}_3(k)$ in the two other filtered projections that lead to over-convolutions. FIG. 6, moreover, shows the schematic, not true-to-scale curve of this convolution in order to illustrate the effects.

Figure 7:
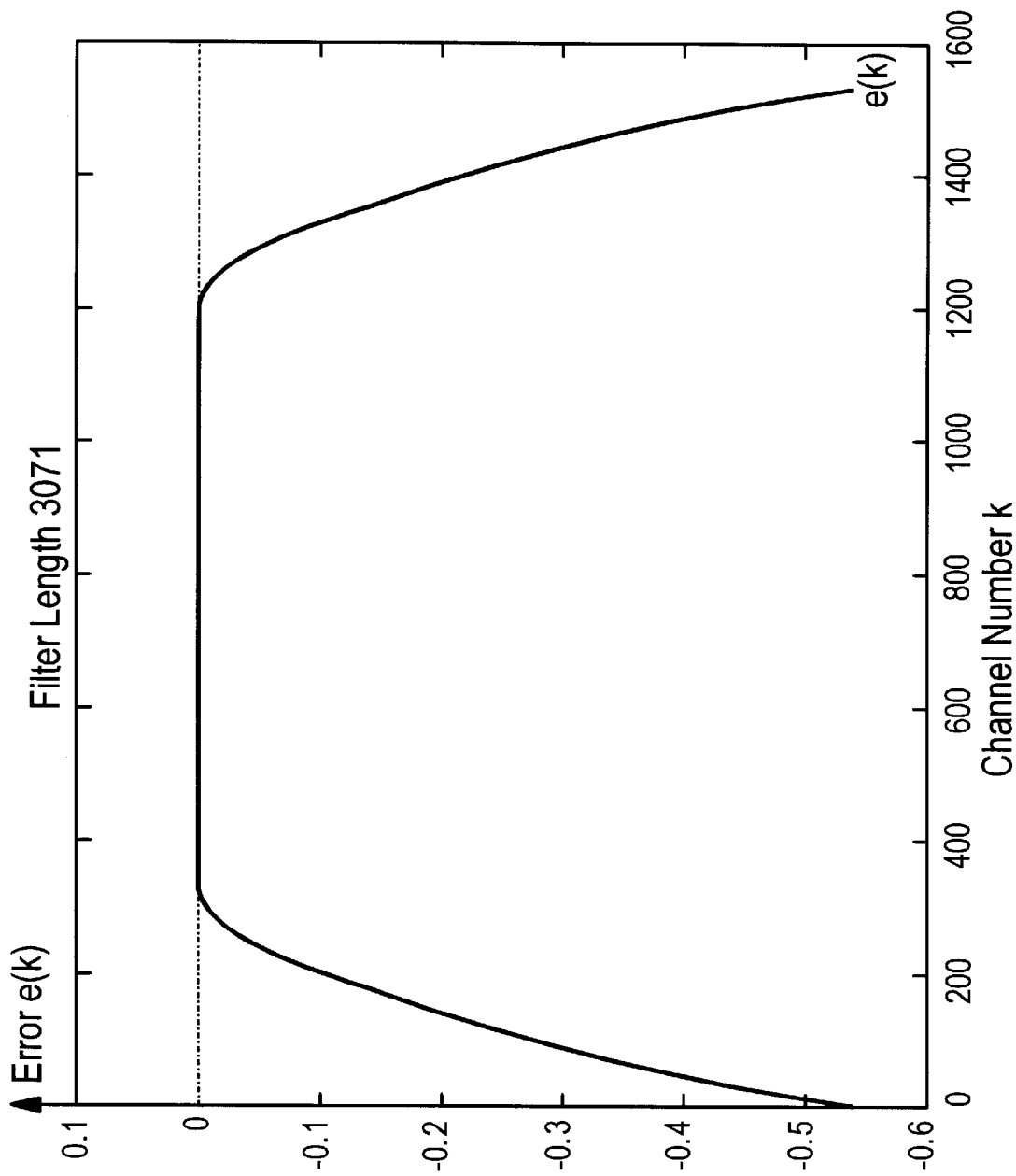
FIG. 7 shows the absolute error e(k) of the fast convolution of measured projections of a phantom according to the defined method given the full length 2N −1 of the filter kernel the spatial domain.
Figure 8:
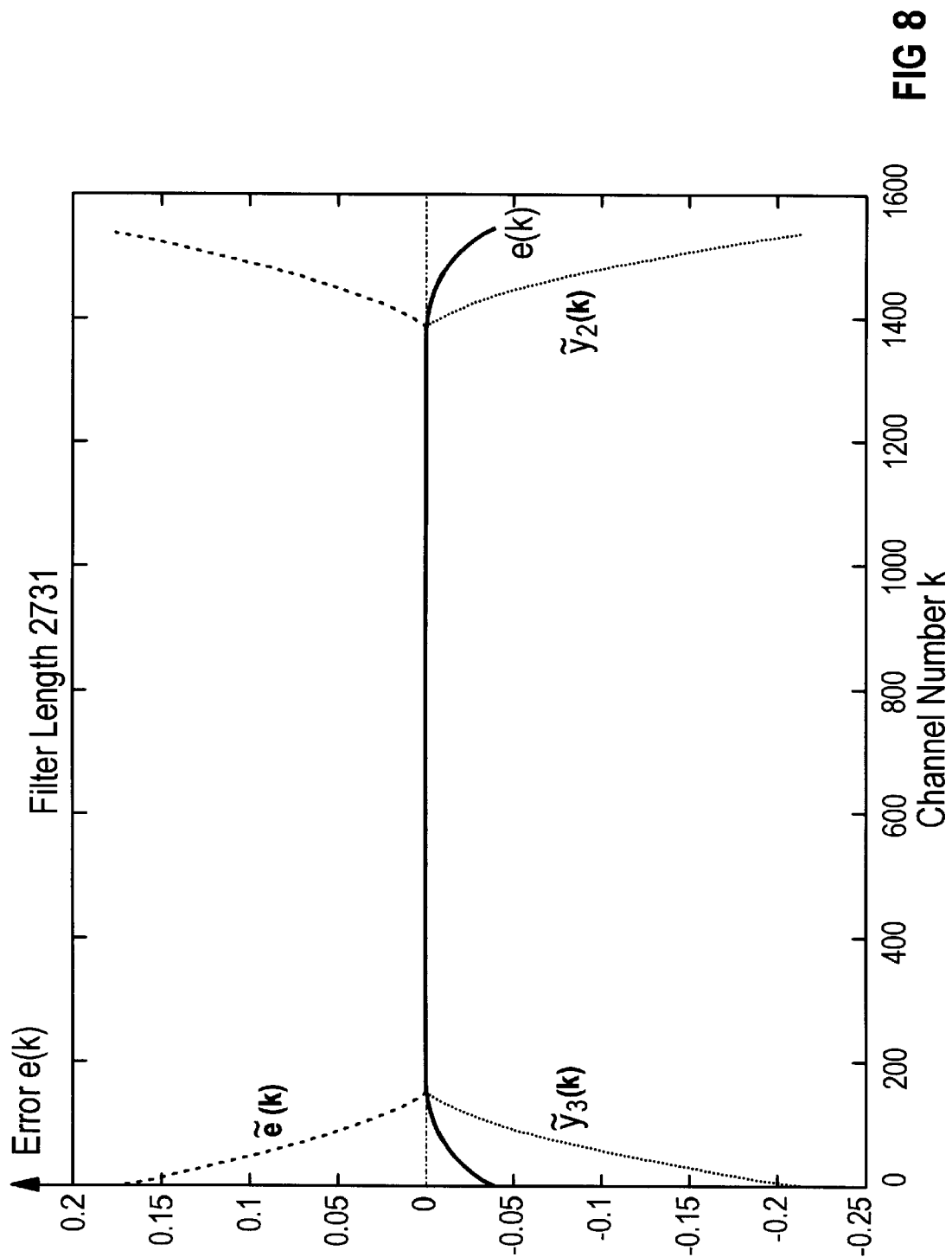
FIG. 8 shows the absolute error e(k) of the fast convolution of measured projections of a phantom according to the inventive method given a length N+S of the filter kernel in the spatial domain.
Figure 9:
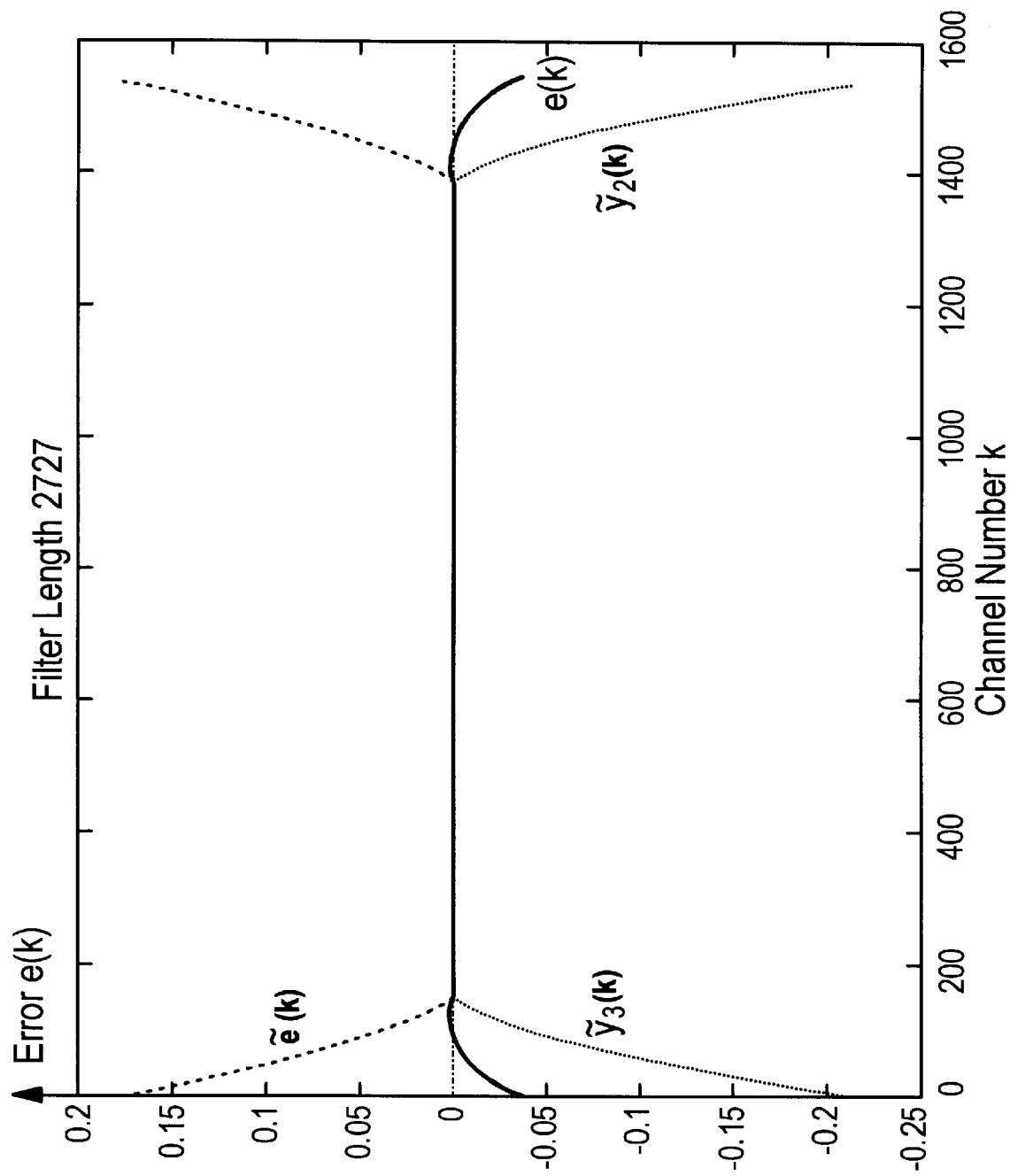
FIG. 9 shows the absolute error e(k) in the fast convolution of measured projections of a phantom according to the inventive method given a shortened length (N+S)−4 of the filter kernel in the spatial domain.

FIGS. 7 through 9 illustrate the absolute error e(k) that occurs given different lengths of the filter kernel in the spatial domain in the calculation of the inventive method of fast convolution compared to the defined method of fast convolution. FIG. 7 shows the absolute error e(k) for the full length of the filter kernel in the spatial domain of 2N −1 that occurs given application of the inventive method of fast convolution. By contrast, FIG. 8 illustrates the absolute error e(k) when calculation in the inventive method of fast convolution is carried out with the shortened length of the filter kernel in the spatial domain of N+S. The three above-recited errors thereby add to form the clearly smaller error e(k). On the basis of a further, slight shortening of the length of the filter kernel in the spatial domain to N+S−4 (see FIG. 9), the absolute error e(k) of the fast convolution according to the inventive method can be improved even more compared to a filter kernel for the water disc that is not modified in length.

For demonstrating that the errors which occur in the calculation of the fast convolution according to the inventive method have only an insignificant effect in the image presentation in computed tomography, FIGS. 10 through 18 show the reconstructed images of a simulated phantom. The phantom is formed by a water disc (0 HU) with a diameter of 49 cm and by a bone (1000 HU) with a diameter of 2 cm given a 23 cm spacing of the mid-point of the bone from the mid-point of the water disc. In the simulation, n=528 parallel projections having a length N=1536 channels were registered. The reconstruction of the images shown in FIGS. 10 through 18 ensued using the Shepp-Logan filter kernel.

Figure 10:
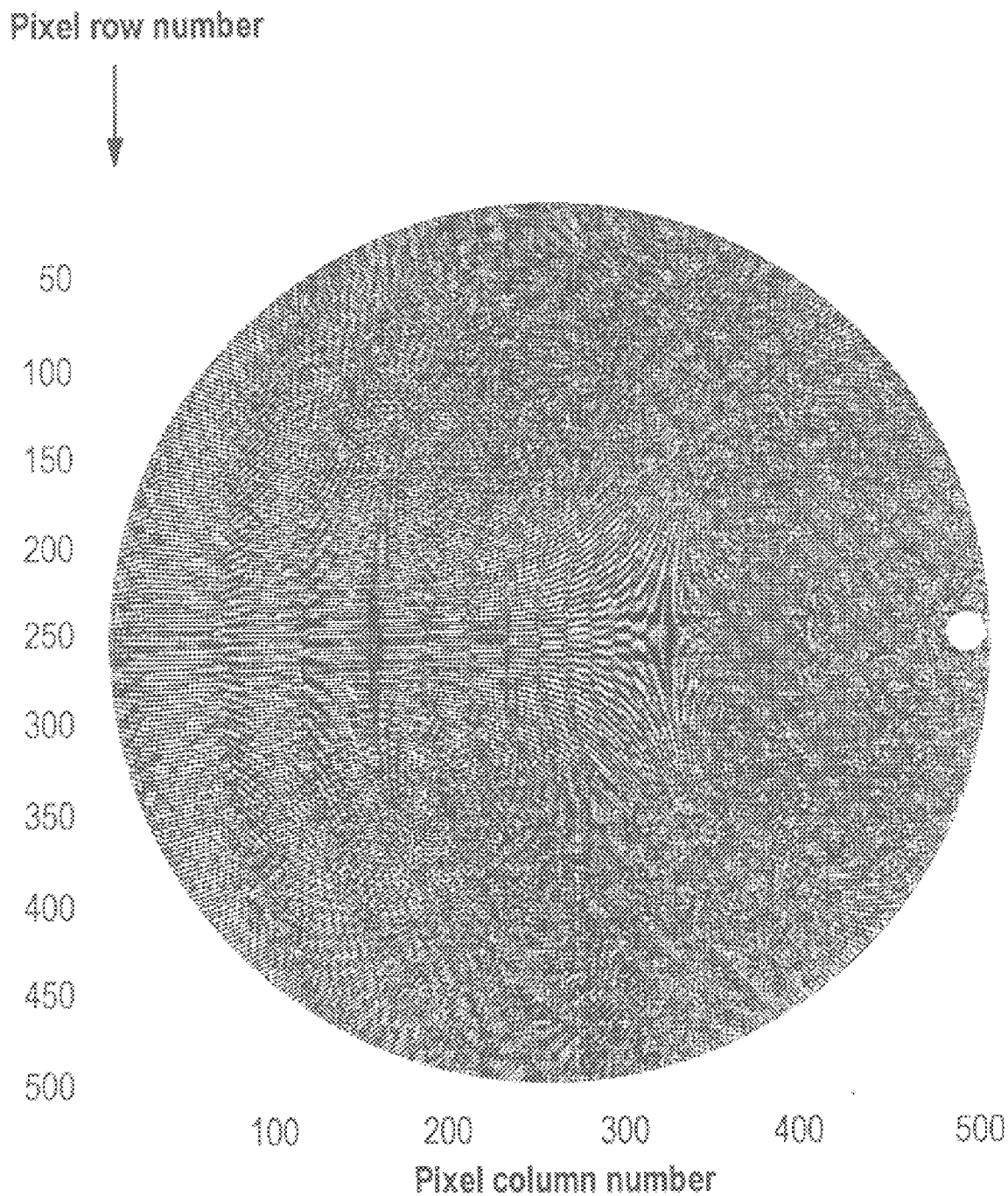
FIG. 10 shows a reconstructed image of a phantom on the basis of simulated projections using the defined method of fast convolution.
Figure 11:
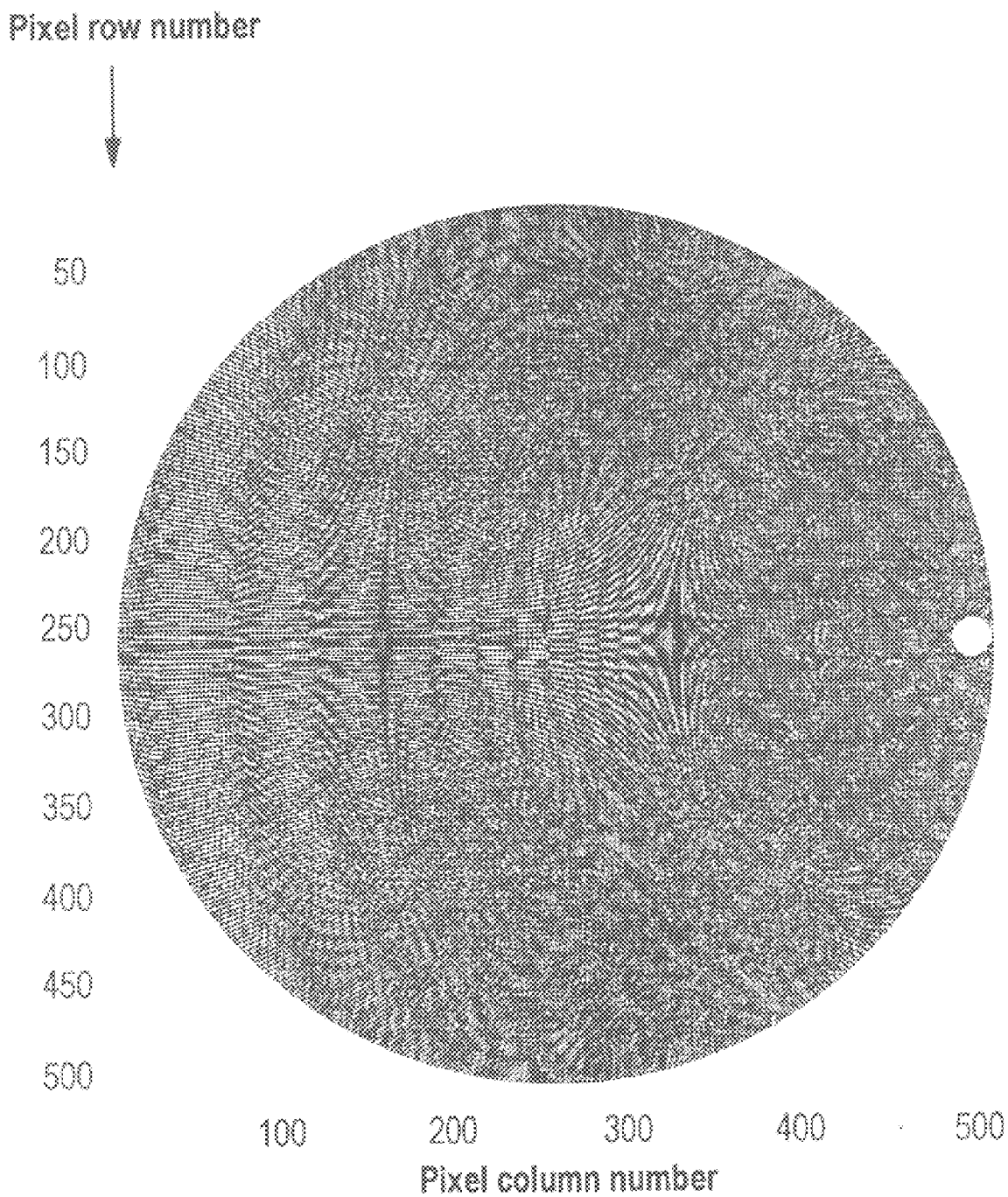
FIG. 11 shows a reconstructed image of a phantom on the basis of simulated projections using the inventive method of fast convolution.
Figure 12:
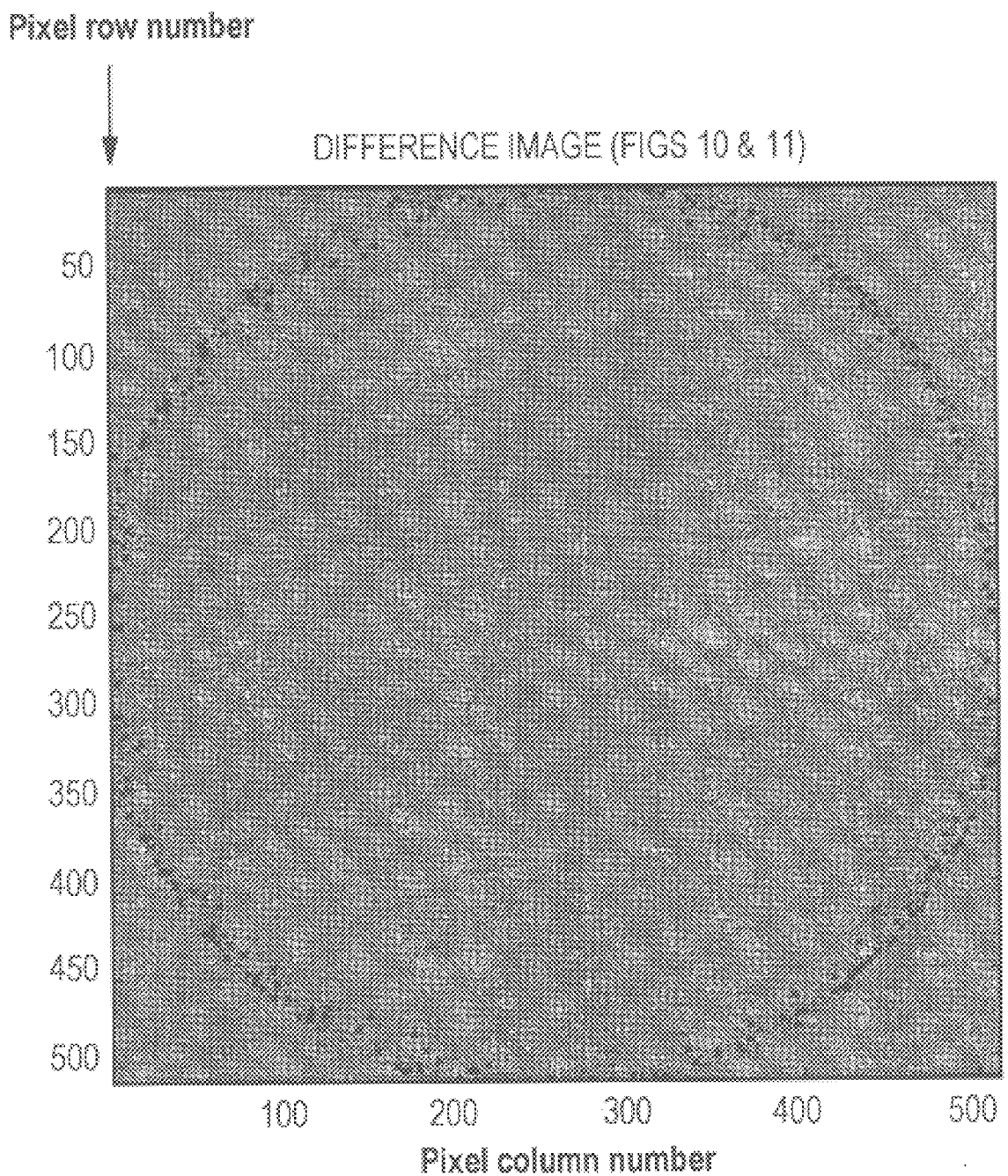
FIG. 12 shows the difference image of the two images of FIGS. 10 and 11 (maximum difference=±1 HU).
Figure 13:
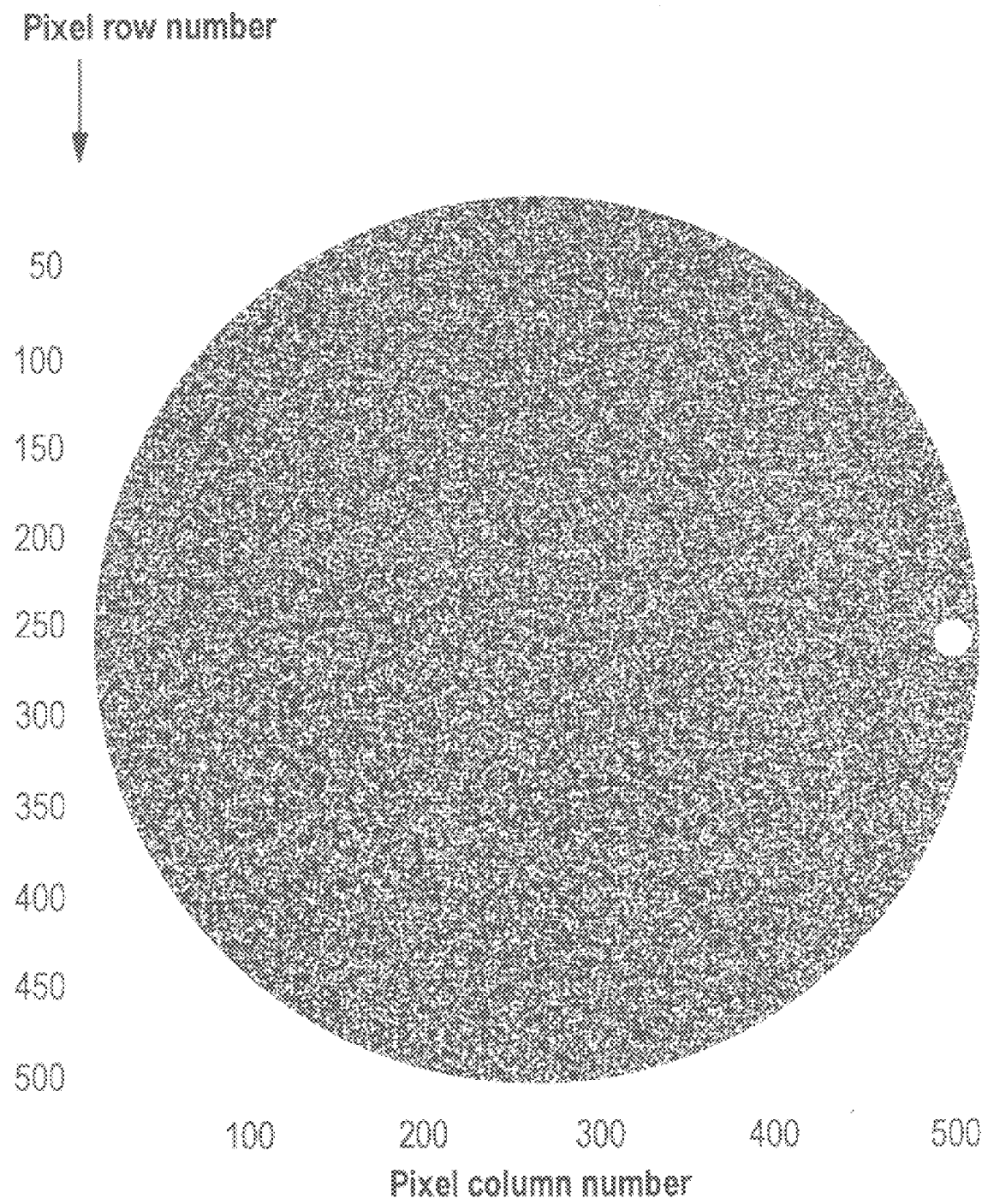
FIG. 13 shows a reconstructed image of a phantom on the basis of the same dataset as in FIG. 10 with noise independent of measured value using the defined method of fast convolution.
Figure 14:
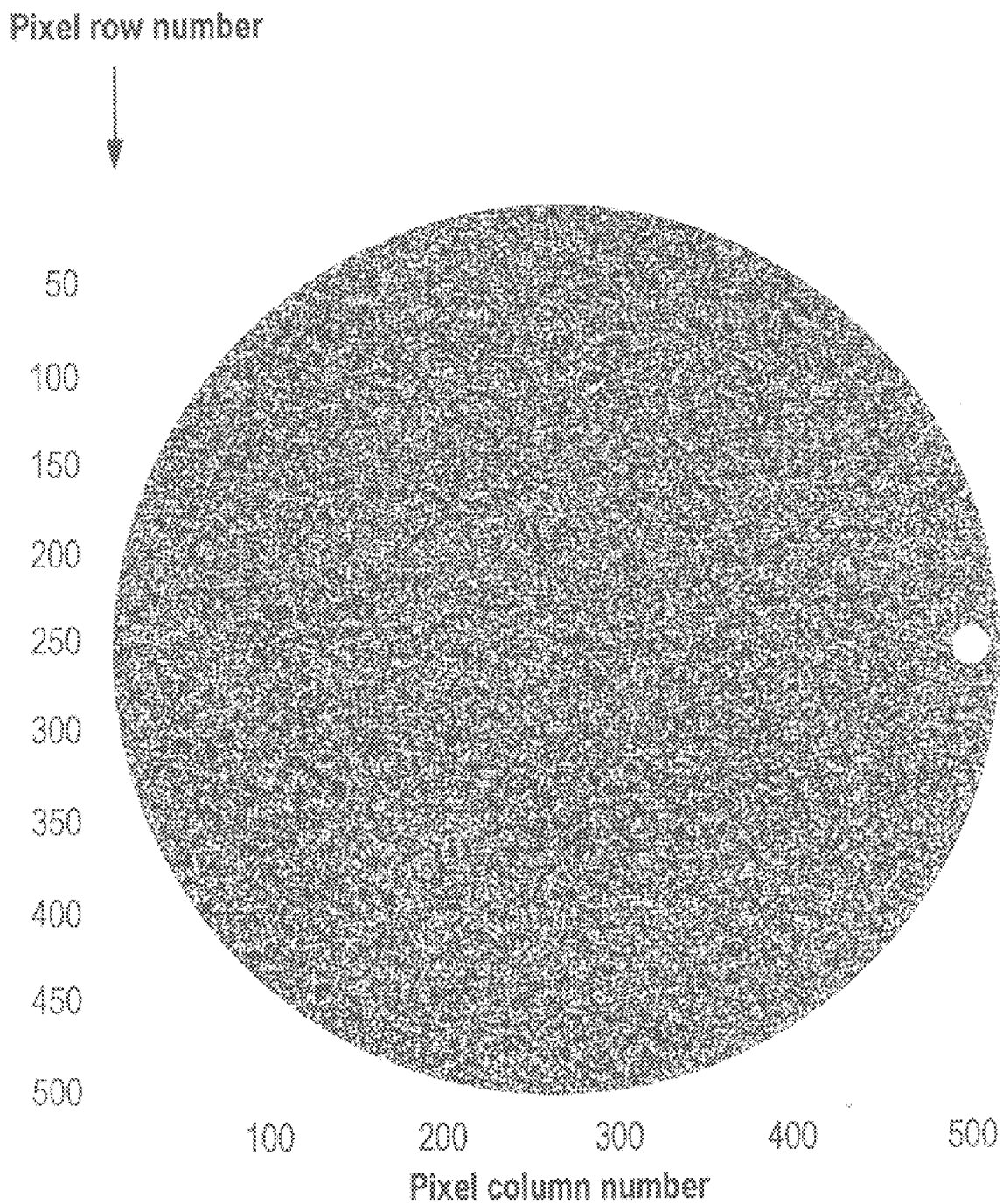
FIG. 14 shows a reconstructed image of the phantom on the basis of the same dataset as in FIG. 10 with noise independent of measured value using the inventive method of fast convolution.
Figure 15:
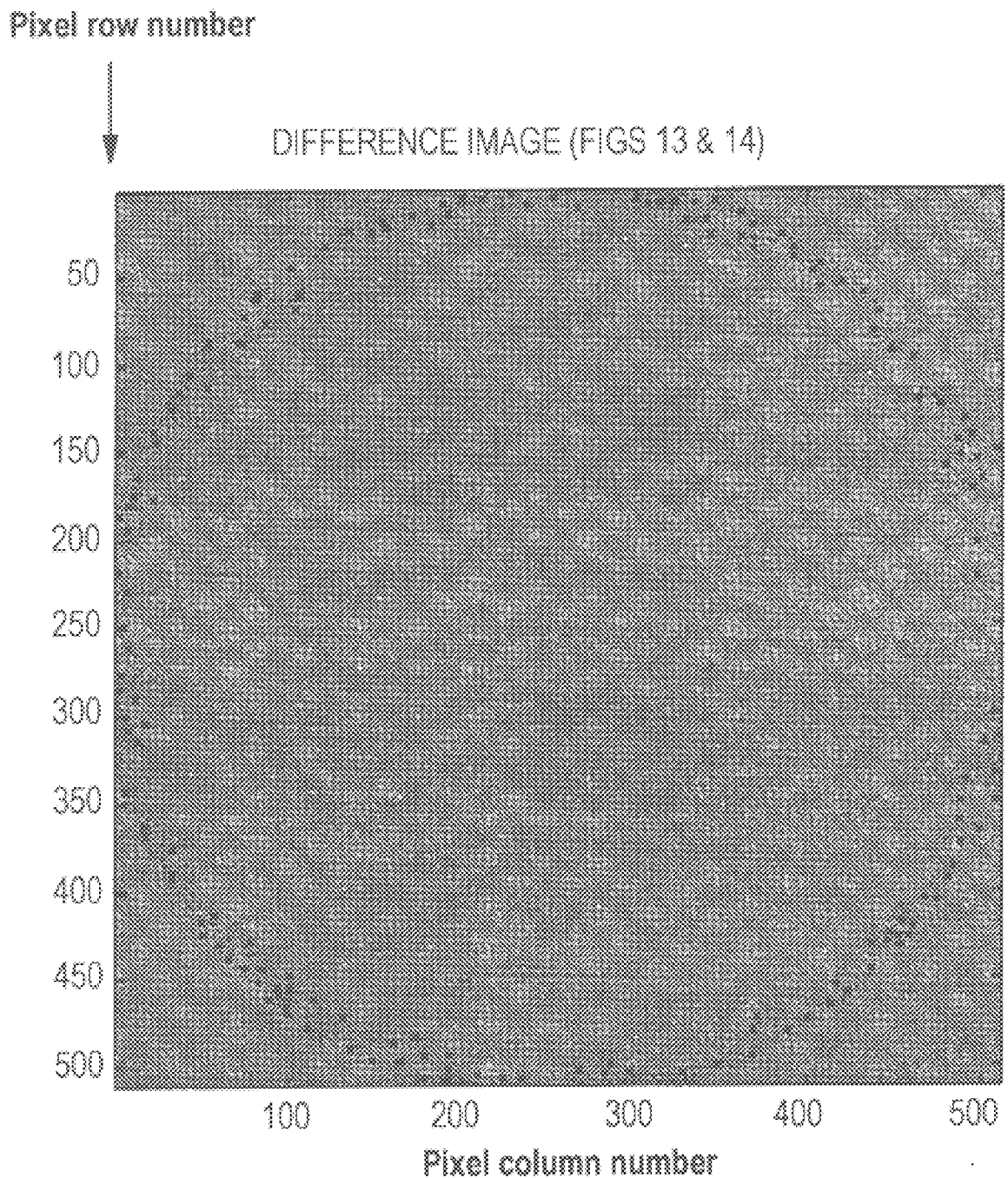
FIG. 15 shows the difference image of the two images of FIGS. 13 and 14 (maximum difference=±1 HU).
Figure 16:
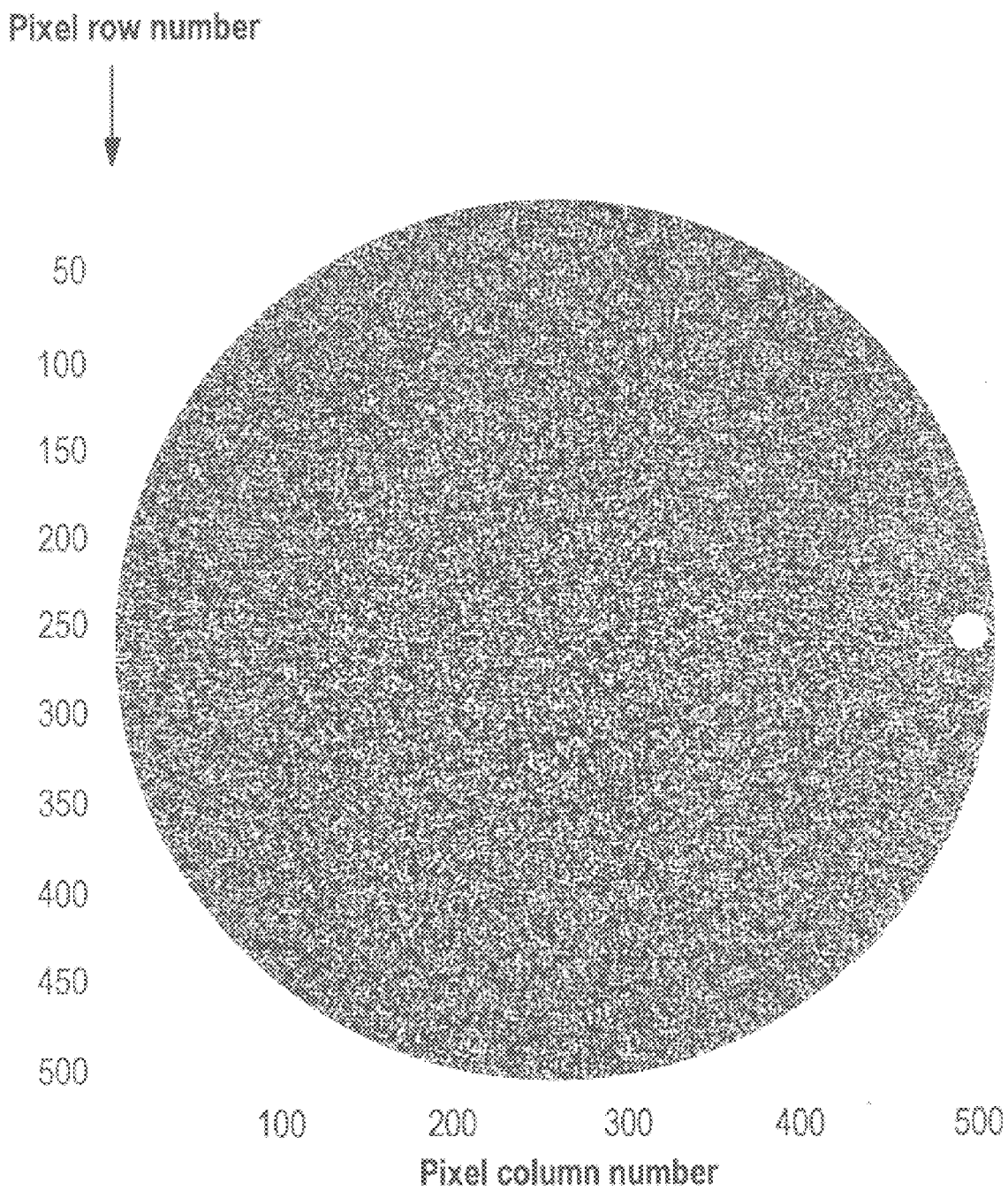
FIG. 16 shows a reconstructed image of the phantom on the basis of the same dataset as in FIG. 10 with noise dependent on measured value using the defined method of fast convolution.
Figure 17:
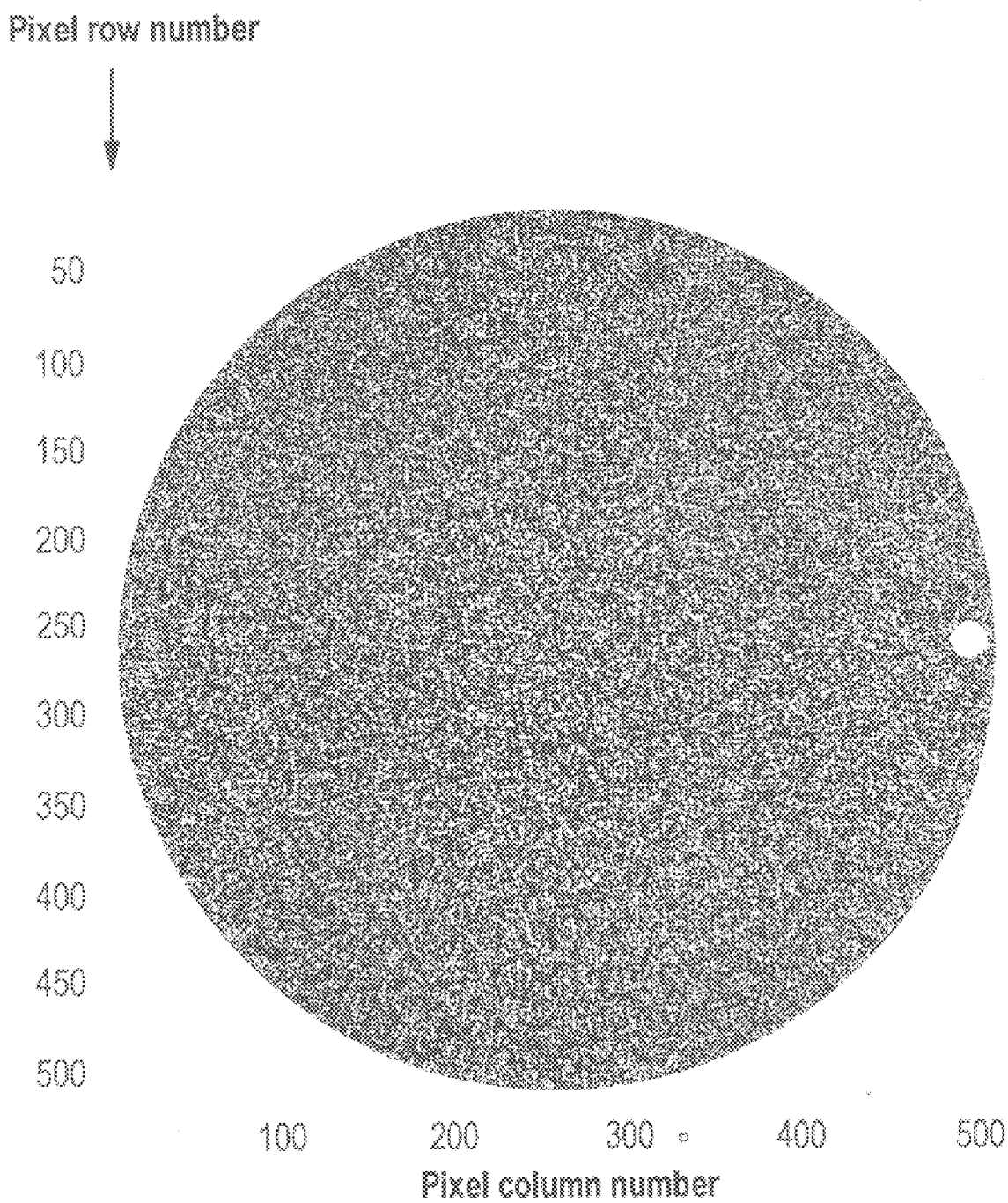
FIG. 17 shows a reconstructed image of the phantom on the basis of the same dataset as in FIG. 10 with noise dependent on measured value using the inventive method of fast convolution.
Figure 18:
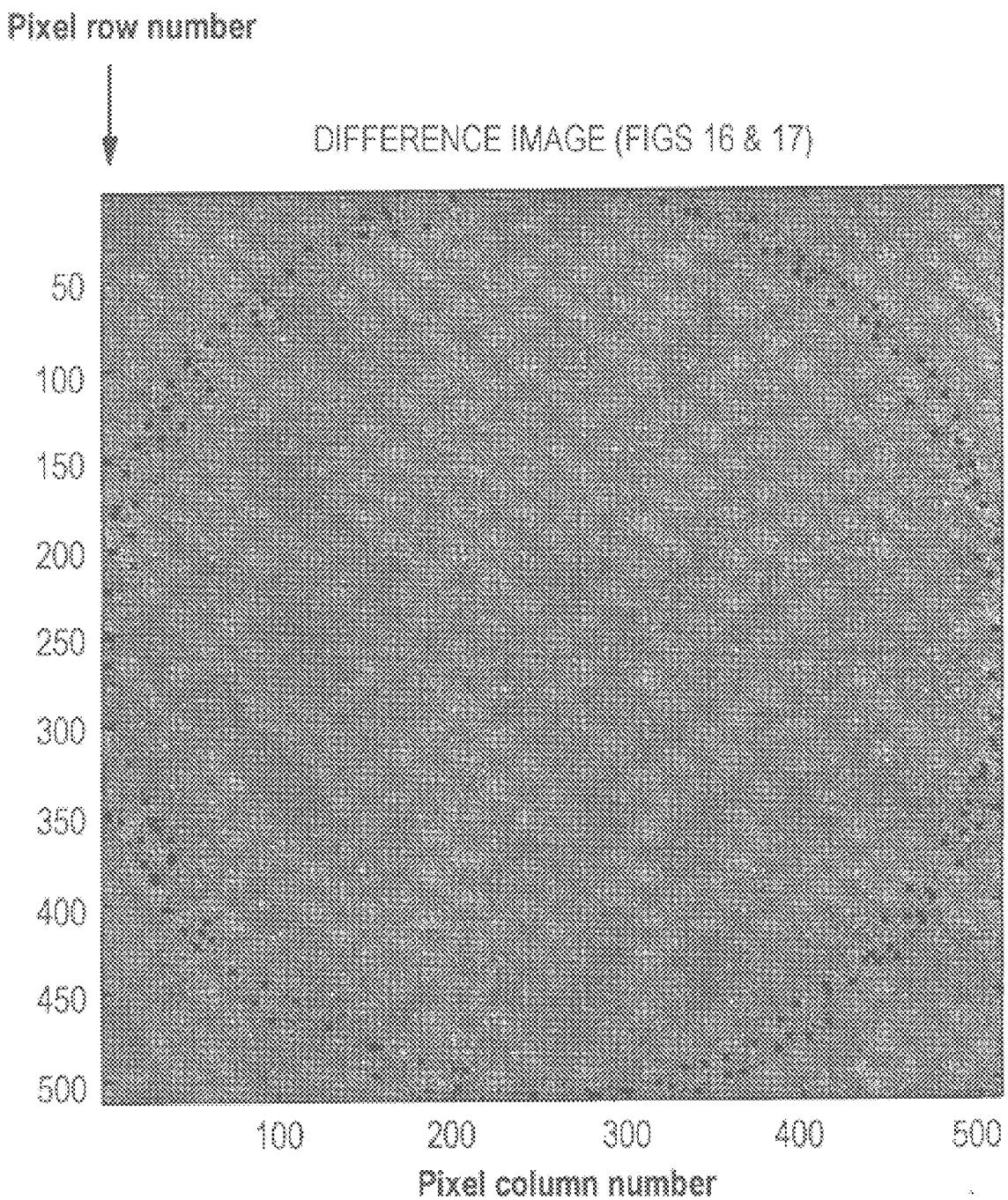
FIG. 18 shows the difference image of the two images of FIGS. 16 and 17 (maximum difference=±1 HU).

Whereas FIG. 10 shows a reconstructed image of the phantom on the basis of the n=528 measured parallel projections using the defined method of fast convolution, FIG. 11 shows a reconstructed image of the same phantom on the basis of the n=528 parallel projections using the inventive method, whereby, as described, 2×3 projections split into real and imaginary part were simultaneously convolved. FIG. 12 shows the difference image, the two images in FIGS. 10 and 11 differing by a maximum of ±1 HU. As described, the error only occurs at the outer annulus of 5 cm. Further, the same dataset was examined in FIGS. 13–15 with noise independent of the measured values and in FIGS. 16–18 with noise dependent on the measured values, whereby, as can be seen from FIGS. 15 and 18, the errors are ±1 HU in the difference images of the defined method to the inventive method.

The inventive method of fast convolution in fact violates the definition of fast convolution, but the error is negligible in computed tomography applications as long as the arising error lies below a certain threshold. This means that an error that takes effect in the reconstructed image of a measured projection in the range up to 1 HU can definitely be tolerated.

The inventive method of fast convolution can substantially shorten the calculating time. In the case of the above-described example with the transformation length M=8192 and 2p =6 projections, a reduction of the multiplications of about 28% per projection can be achieved compared to the defined convolution with M=4096 and two projections (see Table 1).

It is assumed in Table 1 that the defined fast convolution of the transformation length M with a real filter kernel has 4M $Log_2$ M+2 M real multiplications.

| Projections | FFT length M | Multiplications | Mult./Proj. | Mult./Proj./ 102400 |
|---|---|---|---|---|
| 2*1 | 4096 | 2040800 | 102400 | 1 |
| 2*3 | 8192 | 442368 | 73728 | 0.72 |

Moreover, a prerequisite for the application of the inventive method is that a processor and hardware architecture is available wherein a doubling of the transformation length of the Fast Fourier Transformation does not lead to a disproportionate increase in the calculating time.

The application of the inventive method of fast convolution is not limited to computer tomography; other applications are also conceivable. There is thus the possibility of utilizing the inventive method when the impulse response of a filter kernel in the time domain is relatively small in amount at the edge or/and successive vectors of the signals to be convoluted are similar.

Moreover, the inventive method of fast convolution operates not only with the Shepp-Logan filter kernel but also with other filter cores, for example the known Ramachandran - Lakshminarayanan Kernel.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for image reconstruction in a computed tomography apparatus comprising the steps of:

irradiating a subject with x-rays from n different projection angles and obtaining data, representing attenuation of said x-rays by said subject for n measured projections respectively associated with said n projection angles;

supplying said data to a computer and in said computer conducting a fast convolution of said data with a transformation length M while allowing slight over-convolution errors to obtain convolved data, by convolving p out of said n measured projections of a length N with a modified filter kernel $\hat{h}$ (k) using Fast Fourier Transform and Inverse Fast Fourier Transform simultaneously in one step comprising the sub-steps;

combining the p projections having the length N to form a vector and attaching S zeros behind each of the p projections having the length N to form another vector $$v(k) = \sum_{i=1}^{p} v_i(k - (i-1)(N+S))$$

with the transformation length M;

selecting the parameters p and S such that the transformation length $$M = p(N+S) = 2^m$$

for implementation of the fast convolution is a power of 2;

making the filter kernel $\hat{h}$ (k) in the spatial domain substantially equal to a length N+S, and filling the filter kernel $\hat{h}$ (k) with zeros to the transformation length M according to $$\hat{h}(k) = \begin{cases} h(k) & \text{for } |k| < (N+S)/2 \\ 0 & \text{otherwise} \end{cases}$$

cyclically implementing the fast convolution with the transformation length M according to $$y(k) = v(k) \circledM \hat{h}(k) = IFFT\{FFT\{v(k)\}FFT\{\hat{h}(k)\}\}$$

with $k = 0(1)(M-1)$, with a convolution result of a projection i exhibiting the form $$y_i(k) = y(k + (i-1)(N+S))$$

with $$k = 0(1)(N-1)$$

and $$i = 1(1)p;$$

and reconstructing an image of at least a slice of said subject using said convolved data.

2. A method for image reconstruction in a computed tomography apparatus comprising the steps of:

irradiating a subject with x-rays from n different projection angles and obtaining data, representing attenuation of said x-rays by said subject for n measured projections respectively associated with said n projection angles;

supplying said data to a computer and in said computer conducting a fast convolution of said data with a transformation length M while allowing slight over-convolution errors to obtain convolved data, by convolving p out of said n measured projections of a length N with a modified filter kernel $\hat{h}$ (k) using Fast Fourier Transform and Inverse Fast Fourier Transform simultaneously in one step comprising the sub-steps;

combining the 2p projections having the length N to form a vector and attaching S zeros behind each of the 2p projections having the length N to form another vector $$v(k) = \sum_{i=1}^{p} v_i(k - (i-1)(N+S)) + jv_{i+3}(k - (i-1)(N+S))$$

with the transformation length M;

selecting the parameters p and S such that the transformation length $$M = p(N+S) = 2^m$$

for implementation of the fast convolution is a power of 2;

making the filter kernel $\hat{h}(k)$ in the spatial domain substantially equal to a length N+S, and filling the filter kernel $\hat{h}(k)$ with zeros to the transformation length M according to $$\hat{h}(k) = \begin{cases} h(k) & \text{for } |k| < (N+S)/2 \\ 0 & \text{otherwise} \end{cases}$$

cyclically implementing the fast convolution with the transformation length M according to $$y(k) = v(k) \ \textcircled{M} \ \hat{h}(k) = IFFT\{FFT\{v(k)\}FFT\{\hat{h}(k)\}\}$$

with $k = 0(1)(M-1)$, with a convolution result of a projection i exhibiting the form $$y_i(k) = Re\{y(k+(i-1)(N+S))\}$$

$$y_{I+3}(k) = Im\{y(k+(i-1)(N+S))\}$$

with $k=0(1)(N-1)$ and $i=1(1)p;$ and reconstructing an image of at least a slice of said subject using said convolved data.

* * * * *